July 4, 1950 J. C. REAVIS 2,514,257
LENS PROTECTOR FOR TELESCOPIC GUN SIGHTS
Filed May 12, 1947
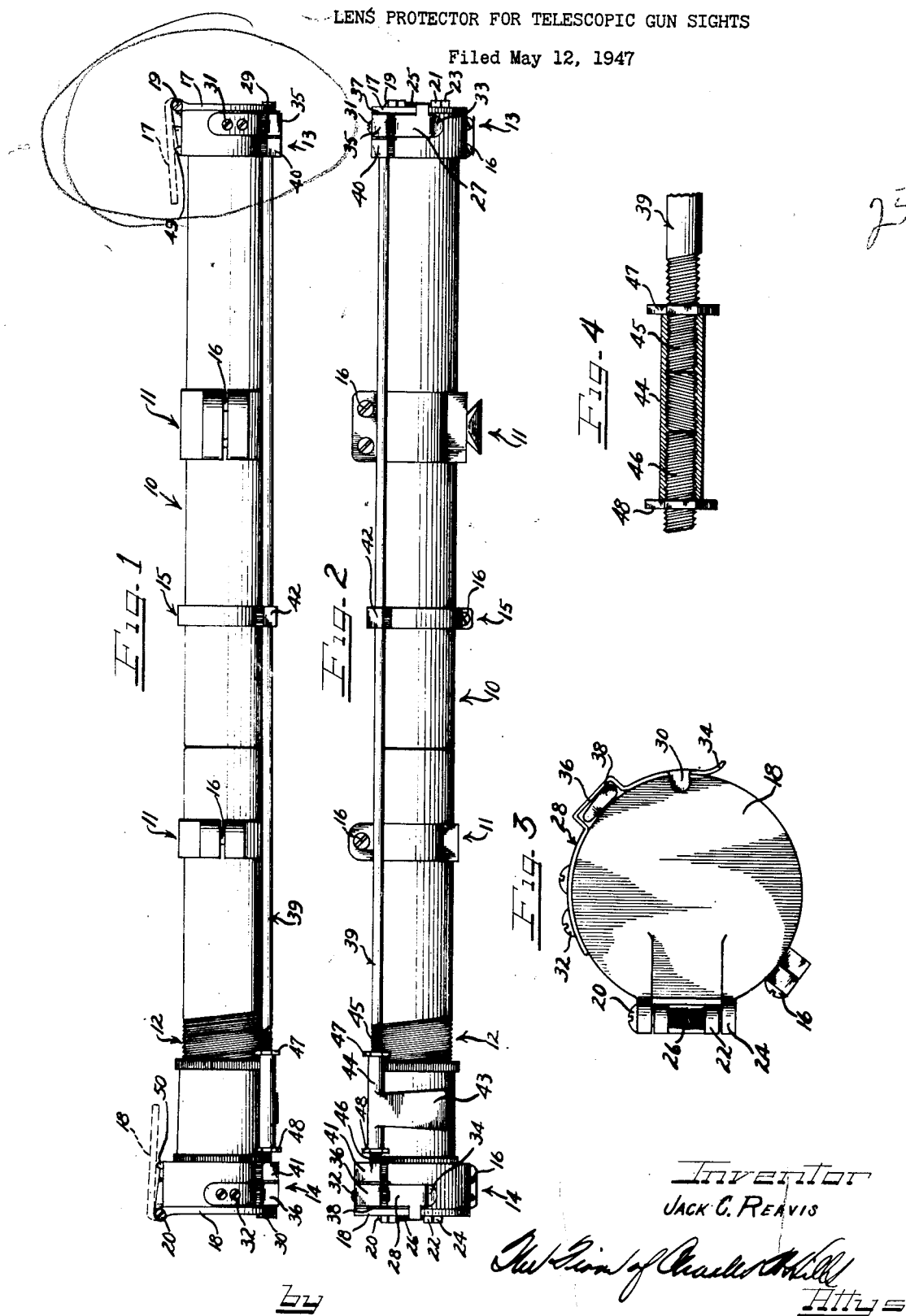
Inventor
JACK C. REAVIS Patented July 4, 1950

2,514,257

UNITED STATES PATENT OFFICE 2,514,257

LENS PROTECTOR FOR TELESCOPIC GUN SIGHTS

Jack C. Reavis, Dayton, Wyo.

Application May 12, 1947, Serial No. 747,559

4 Claims. (Cl. 33—50)

This invention relates to lens protectors and more particularly to lens protectors for telescopic gun sights.

In accordance with my present invention, I provide a pair of lens covers for the front and rear lenses of a telescopic sight which lens covers in closed position, are adapted to keep dust, dirt, snow and other foreign matter out of contact with the lenses of the sight. When the telescopic sight is applied to a gun, it will be appreciated that the lens covers should be readily removed from the lenses in order to permit rapid use of the gun. It is further desirable that the covers be permanently attached to the assembled structure so that there will be no danger of loss when the lens covers are removed from the lenses, perhaps hurriedly.

I therefore provide means for pivotally securing the lens covers at the ends of a telescope sight so that the covers made be pivoted from operative position tightly covering the lenses to inoperative position out of the line of vision through the sight. I further provide a single operating means for rapidly and simultaneously releasing the covers from in front of the lenses and permitting automatic movement thereof to a position out of the line of vision, said means being capable of actuation by a single finger or thumb of one hand while still grasping the gun in the both hands.

In an assembly where the lens covers are to be permanently attached to the sight, it will be understood that it is highly desirable to maintain the sight as free of obstructions in the general line of sight as is possible. Accordingly my lens covers are adapted to rotate through 270° to extend parallel with the sight. In such position, furthermore, there is the least danger of injury to the lens covers.

In general, American-manufactured telescopic sights have an eye focus depending on lengthening or shortening of the sight for adjusting to the eye of the individual user. I therefore provide a lens cover assembly adapted to be adjusted to the increase or decrease in length of the sight when adjustment thereof is necessary.

It is therefore an important object of this invention to provide a cover assembly for protecting the ends of a telescopic sight including a pair of lens covers which may be readily removed from the line of sight as the result of a simple manipulation of a single finger or thumb of one hand.

It is a further important object of the invention to provide lens protectors which will not obstruct vision along the general line of aim of the telescope when in inoperative position, such inoperative position of the covers also minimizing the danger of damage thereto.

It is a further important object of the invention to provide a lens cover assembly including an actuating linkage for effecting movement to inoperative position of a pair of lens covers which mechanism is adjustable to allow for focusing of the sight by increase or decrease in the length thereof.

It is also an important object of the invention to provide resilient seating means for the lens covers to insure protection of the lenses from access of moisture, dust, etc., thereto.

Other and further important objects of this invention will be apparent from the disclosure in the specification in the accompanying drawings.

On the drawings:

Figure 1 is a plan view of a telescopic gun sight having a lens protector assembly embodying the principles of my present invention;

Figure 2 is a side elevational view of the device illustrated in Figure 1;

Figure 3 is an end elevational view of the device; and

Figure 4 is a fragmentary longitudinal sectional view partly in elevation of the adjusting means for the actuating rods of my lens protector assembly.

As illustrated in Figures 1 and 2, the reference numeral 10 indicates generally a telescopic gun sight to which the lens protector assembly of my invention may be applied. The sight has a pair of mounting brackets indicated by the reference numeral 11 and threaded means 12 for focusing the sight by varying the length of the telescope as will be readily understood by those skilled in the art.

The lens protecting assembly of my device comprises forward and rear mounting sleeves 13 and 14 respectively and an intermediate bracket 15. These sleeves and support brackets are all of a general U-shape and are adopted to be clamped together by means of screws 16. Pivotally mounted on the support sleeves 13 and 14 are lens covers 17 and 18 which are adopted to rotate between closed, lens-protecting position and open, sighting position. These covers are mounted on pivot screws 19 and 20 threaded into ears 21 and 22 of the support sleeves 13 and 14 and through ears 23 and 24 of the covers 17 and 18. Springs 25 and 26 are wrapped about the pivot screws 19 and 20 and are so arranged as to urge the lens covers into fully open position.

Holding the lens covers in closed, lens-protecting position are a pair of curved strips of springy material 27 and 28 having a pair of radially inwardly extending flanges 29 and 30 which project into the sight openings and are adapted to engage the outer surfaces of the lens covers 17 and 18 to hold them in their fully closed position. As best seen in Figure 3 the springs are anchored to the support sleeves 13 and 14 by means of screws 31 and 32 at one end, the inwardly projecting flanges being located adjacent the free ends thereof. At the tips of the free ends of the strip flanges, the strips are outwardly curved for permitting ready grasping thereof to manipulate the strips, as indicated by reference numerals 33 and 34. The screws and strips may be so aligned that the strips must be sprung slightly axially of the telescope in order to engage the outer surface of the lens covers. This somewhat torsional tension of the spring strips 27 and 28 will serve to hold the lens covers tightly in place in lens-protecting position. The tips of the flanges 29 and 30 may be slightly curved axially outwardly (not shown) for rapid engagement of the outer surfaces of the lens covers and for slight wedging axially inwardly thereof.

As shown in Figure 3, the strip springs 27 and 28 have bent portions 35 and 36 forming generally rectangular openings with the edge portions of the mounting sleeves for receiving flattened cam end portions 37 and 38 of a split actuating rod indicated generally by the reference numeral 39.

As the actuating rod is rotated the flattened cam ends 37 and 38 bear against the curved portions 35 and 36 of the strip springs 27 and 28 and cause the same to move upwardly away from the support sleeves. This upward movement in turn causes disengagement of the flanges 29 and 30 from the respective lens covers 17 and 18 allowing said lens covers to swing into open, sighting position shown in dotted outline in Figure 1. The actuating rod 39 is journalled in bearing portions 40 and 41 of the front and rear support sleeves and bearing portion 42 of the intermediate support bracket 15. An actuating lever 43 is attached to the rod near the rear end thereof so that it may be operated by the user of the sight without taking his hand off the gun and further may be operated by one finger of a hand of the user. This actuating lever 43 has an internally threaded sleeve portion 44 into which are threaded the split ends 45 and 46 of the actuating rod 39, as best seen in Figure 4. Nuts 47 and 48 are operative to interlock the lever and the ends of the actuating rods 45 and 46 for simultaneous rotation when the actuating lever 43 is manipulated. Thus if it is desired to adjust the focus of the telescopic sight, the nuts 47 and 48 may be loosened and the threaded ends of the split actuating rods 39 may be adjusted with the sight to the new length thereof. The nuts may then be tightened to prevent relative rotation.

As indicated in Figure 1 the springs 25 and 26 and pivots for the lens covers are so arranged that when the lens covers are released as by rotating the actuating lever 43 the lens covers will rotate through 270° to a position extending axially of the telescope generally along the sides thereof. Stops 49 and 56 may be provided on the support sleeves as stops for the lens covers 17 and 18 in the open sighting position. These stops are preferably made of a rubber or the like in order to absorb the shock of impact of the lens covers thereagainst and further to prevent any noise which might be undesirable.

In order to reclose the lens covers, which it will be appreciated may be done at the leisure of the user of the sight and without the speed desirable in opening, each lens cover is individually rotated into closed position and the associated strip spring is lifted by means of its free upwardly turned portion 33 or 34 to permit full closure of the lens cover and then allowed to spring back downwardly and perhaps is guided slightly outwardly axially of the sight to firmly engage the outer surfaces of the lens covers and hold them tightly in place against the support sleeves. Because of the cam method of release of the springs 27 and 28, it will be appreciated that it is possible to manipulate each spring individually without affecting the other, and therefore that it is unnecessary to close both lens covers simultaneously.

To place the sight in condition for operation, it is merely necessary to lift the actuating lever 43 slightly whereupon the two cam ends 37 and 38 rotate slightly to release the flanges 29 and 30 from engagement with the outer surfaces of the lens covers 17 and 18, whereupon the lens covers rotate through 270° into open sighting position.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a lens protector for telescopic gun sights including a pair of lens covers pivotally mounted at the ends of the sight and springs urging the covers into non-protective position, an elongated member pivotally mounted on said sight, holding means for engaging said lens covers in protective position, cams at the ends of and operated by said elongated member for releasing said holding means permitting the lens covers rapidly to assume non-protective position, and a threaded connection operatively associated with said elongated member to render the same adjustable to permit focusing of the scope, said holding means being individually re-engageable with said covers without rotation of said elongated member when the elongated member is in non-releasing position.

2. An adjustable lens protector for a telescopic gun sight comprising a lens cover pivotally mounted at the end of the sight for movement from a closed, lens-covering position to an open position parallel to and resting on the body of the gun sight, a resilient strip mounted on each end of said sight having a flange overlapping said lens cover to retain the same in closed position, a spring operative to swing said cover to an open position when said flange is released, and an elongated rod journaled on said telescopic sight having camming end portions engaging said strips for moving them to released position as said rod is rotated, an internally threaded sleeve mounted on said sight, said rod being made in sections having end portions threaded into opposite ends of said internally threaded sleeve, whereby the length of said elongated rod may be adjusted to conform to any adjusted length of said telescopic sights.

3. A lens protector for a telescopic gun sight comprising a lens cover pivotally mounted at the end of the gun sight for swinging movement through substantially 270° from lens covering position to open position parallel to and supported on said gun sight, spring means acting on said cover to move it to open position, holding means for engaging said lens covers in protective position, and an elongated member pivotally mounted on said sight, cams at the end of and operated by said elongated member for releasing said holding means permitting the lens covers rapidly to assume open position, said elongated member being adjustable to permit focusing of the scope, and said holding means being individually re-engageable with said covers without rotation of said elongated member when the elongated member is in non-releasing position.

4. A catch for a spring-urged lens cover pivotally mounted on the body portion of a gun sight at the end thereof comprising a generally arcuate strip of resilient material anchored adjacent one end of said body portion, and movable in a plane substantially normal to the axis of said body portion, a flange secured to the free end of said strip having a flat cover contacting portion extending generally in a plane substantially parallel to the plane of movement of said strip, said resilient strip being anchored at a point slightly removed from the end of said body portion necessitating axial displacement of the free end of said strip relative to said body portion to permit the flat cover-contacting surface of said flange to be moved over said cover to exert an axial thrust against said cover in closed position, and cam means for displacing the free end of said strip radially outwardly relative to said body portion to disengage said flange from said lens cover to permit said cover to pivot from lens covering position to open position.

JACK C. REAVIS.

REFERENCES CITED

The following references are of record in the file of this patent:

UNITED STATES PATENTS

| Number | Name | Date |
| --- | --- | --- |
| 126,892 | Mayo | May 21, 1872 |
| 144,513 | Crannell | Nov. 11, 1873 |
| 442,758 | Soden | Dec. 16, 1890 |
| 464,413 | Armstrong | Dec. 1, 1891 |
| 490,925 | Rae | Jan. 31, 1893 |
| 832,284 | White | Oct. 2, 1906 |
| 1,338,526 | Raphael | Apr. 27, 1920 |
| 1,372,812 | Harmon | Mar. 29, 1921 |
| 2,169,656 | McNeely | Aug. 15, 1939 |
| 2,397,742 | Kals | Apr. 2, 1946 |

FOREIGN PATENTS

| Number | Country | Date |
| --- | --- | --- |
| 16,284 | Great Britain | 1915 |
| 315,447 | Germany | 1919 |
| 317,188 | Germany | 1919 |
| 319,977 | Germany | 1920 |
| 326,946 | Germany | 1920 |